(No Model.)
M. ABT.
VALVE.
No. 604,595. Patented May 24, 1898.
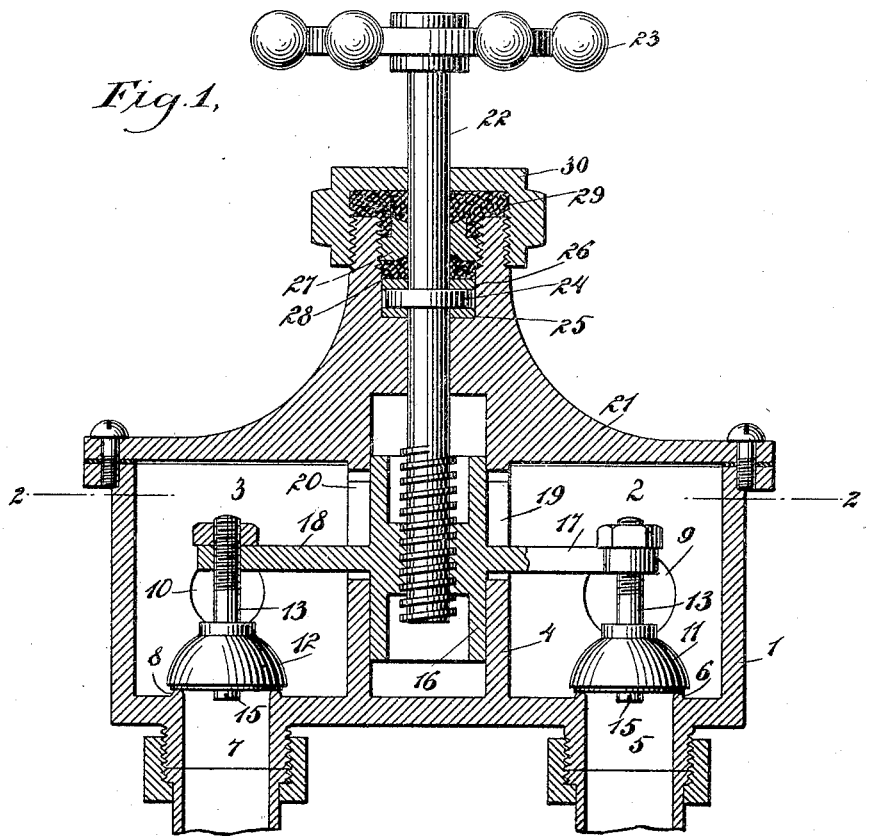
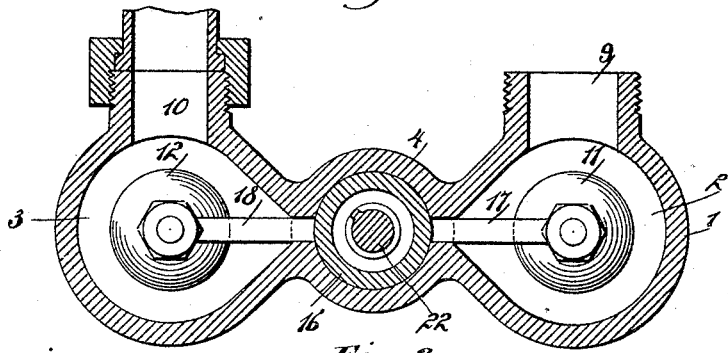
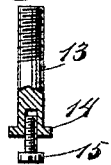
WITNESSES:
Edward Thorpe
C. R. Ferguson
INVENTOR
M. Abt.
BY
ATTORNEYS.

UNITED STATES PATENT OFFICE.

MATHEW ABT, OF NEW YORK, N. Y.

VALVE.

SPECIFICATION forming part of Letters Patent No. 604,595, dated May 24, 1898.

Application filed September 3, 1897. Serial No. 650,477. (No model.)

*To all whom it may concern:*

Be it known that I, MATHEW ABT, of New York city, in the county and State of New York, have invented a new and Improved Valve, of which the following is a full, clear, and exact description.

This invention relates particularly to valves for steam heating-radiators; and the object is to provide a simple and effective means whereby both the inlet and outlet valves may be simultaneously operated, thus obviating any possible danger that might arise from leaving one valve open and the other closed.

I will describe a valve embodying my invention and then point out the novel features in the appended claim.

Reference is to be had to the accompanying drawings, forming a part of this specification, in which similar characters of reference indicate corresponding parts in all the views.

Figure 1 is a vertical section of a valve embodying my invention. Fig. 2 is a section on the line 2 2 of Fig. 1, and Fig. 3 is a partial section of a valve-stem employed.

Referring to the drawings, 1 designates a valve-casing having two chambers 2 3, separated by a tubular guideway 4. Leading into the chamber 2 is a steam-inlet 5, having a valve-seat 6, and leading from the chamber 3 is a steam-outlet 7, having a valve-seat 8. The radiator-pipes have communication with the chambers 2 and 3 through the nipples 9 and 10.

Arranged to engage upon the valve-seat 6 is a valve 11, and a similar valve 12 is designed for engagement with the valve-seat 8. These valves 11 and 12 may be made of any suitable material, and each valve has a stem 13, provided with a head 14, seated in the body of the valve, and as a means for more rigidly holding the parts together I employ screws 15, which pass through the valves and into tapped holes in the stems.

Movable longitudinally in the guideway 4 is a nut 16, from which arms 17 18 extend through slots 19 20, formed in the wall of the guideway, and to the outer ends of the arms 17 18 the valve-stems 13 are connected. As here shown, the valve-stems are screw-threaded to engage in tapped holes in the arms, so that the valves may be readily adjusted for engagement with their seats and locked by lock-nuts on the upper part of stems 13 above the arms 17 and 18.

The nut 16 is sufficiently long to serve as a closure for the slots 19 and 20, and thus prevent the passage of steam directly from one chamber to the other. The upper portion of the nut 16 is movable into a recess formed in the bonnet 21, secured to the casing 1. Engaging with the nut 16 is an operating-rod 22, which passes through the bonnet 21 and is provided at its outer end with a suitable handpiece 23. The rod 22 is provided with a collar 24, engaged between washers 25 and 26, seated in a recess formed in the bonnet 21, and between the upper washer 26 and a nut 27 is a packing 28. The nut 27 engages with an interior screw-thread formed in the upper recess of the bonnet; and, as shown in the drawings, the nut surrounds the rod 22. Above the nut 27 is a packing 29, held in place by a cap 30, having screw-thread engagement with the bonnet.

In operation it will be seen that by rotating the rod 22 the valves may be simultaneously opened or closed.

This valve is particularly an improvement on the valve for which I obtained a patent under date of August 3, 1897, No. 587,632, and the features of said patent I do not broadly claim herein; neither do I broadly claim a screw-stem held from longitudinal movement.

Having thus described my invention, I claim as new and desire to secure by Letters Patent—

A valve comprising a casing having two chambers, a tubular guide separating the chambers and having opposite slots, a nut movable in the guide and forming a closure for the slots, arms integral with the nut and extended through the slots of the guide, valves adjustably connected to said arms for controlling inlet and outlet openings, a screw-rod engaging with the nut and means for holding said rod from longitudinal movement, substantially as specified.

MATHEW ABT.

Witnesses:
EVERARD BOLTON MARSHALL,
C. R. FERGUSON.